Nov. 6, 1951     G. UNTERBERG     2,573,778
GRAIN OR SEED CLEANER

Filed March 5, 1947     3 Sheets-Sheet 1

INVENTOR.
Gustav Unterberg
Egerton R. Case,
BY
ATTORNEYS.

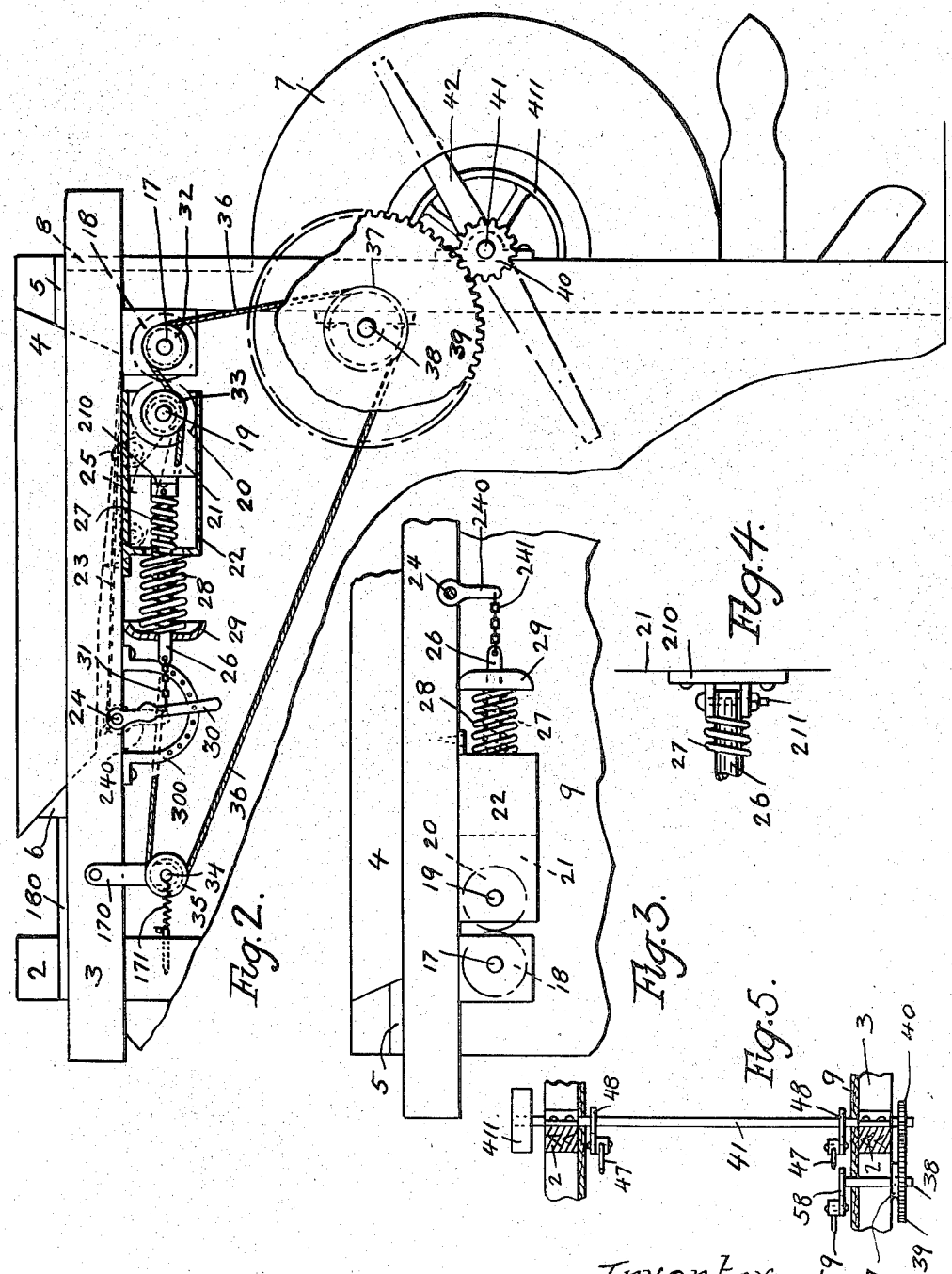

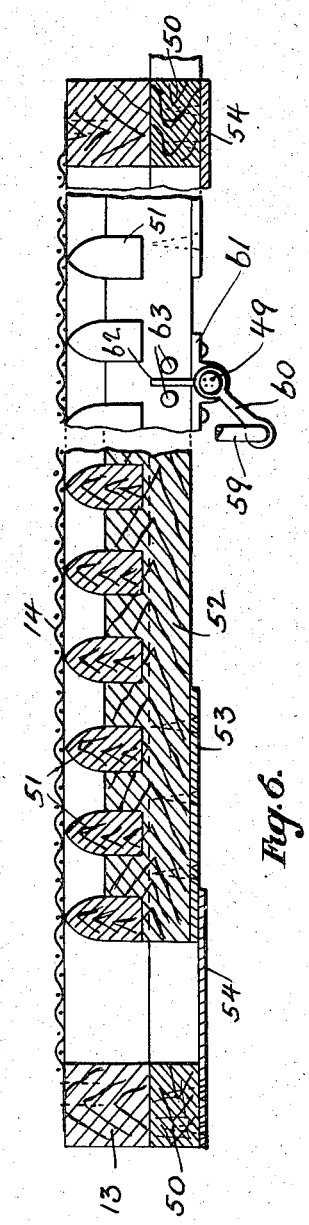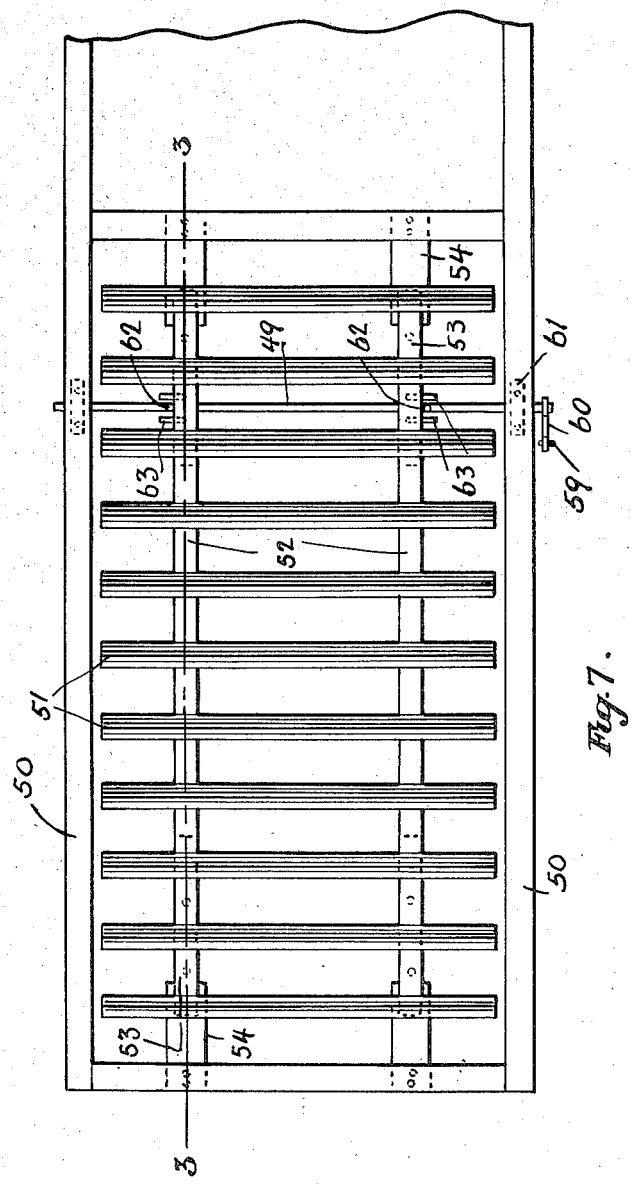

Patented Nov. 6, 1951

2,573,778

UNITED STATES PATENT OFFICE 2,573,778

GRAIN OR SEED CLEANER

Gustav Unterberg, Edmonton, Alberta, Canada

Application March 5, 1947, Serial No. 732,499

3 Claims. (Cl. 209—318)

This invention relates to grain or seed cleaner and the objects of the invention are: (1) to build up and maintain within the apparatus at a substantially constant pressure therethrough a current of air to be passed therethrough and through the grain or seed screen so as to get the maximum of efficiency in cleaning grain or seed, and the separation of broken grain or seed of weeds carried by the air stream together with chaff and straw just before the latter are carried away from the apparatus; (2) to crush relatively soft material, or to readily yield to hard material, as uncleaned grain or seed passes on from the hopper, without breaking this functioning part of the apparatus, and at the same time keep the flow of grain or seed onto the grain screen from being interfered with by chaff or straw at the discharge end of the hopper; (3) to keep the sand screen from being clogged by broken grain lodging therein and so facilitate the passage of sand, broken grain, and heavy seeds of weeds therethrough; (4) to adjustably hang the interchangeable screens so as to facilitate the functioning thereof by securing uniform distribution thereover and controlling the time the uncleaned seed or grain is undergoing screening, and (5) to adjustably support the means used to keep the sand screen unclogged in relation to this latter.

Fig. 2 is, in part, an end elevation of the apparatus and of the driving gear, and a vertical longitudinal section through the means to control spacing of the feed rollers.

Fig. 3 is a side elevation of the controlling means for the feed rollers on the side of the apparatus opposed to that shown in Fig. 2.

Fig. 4 is a detail hereinafter referred to.

Fig. 5 is a schematic plan view of the eccentric means and gear to operate the grain screen and sand screen cleaner.

Fig. 6 is, in part, a vertical longitudinal section of the line 3—3, Fig. 7, and Fig. 7 is a plan of the means used to keep the sand screen unclogged.

In the drawings, like characters of reference refer to the same parts.

Figure 1:
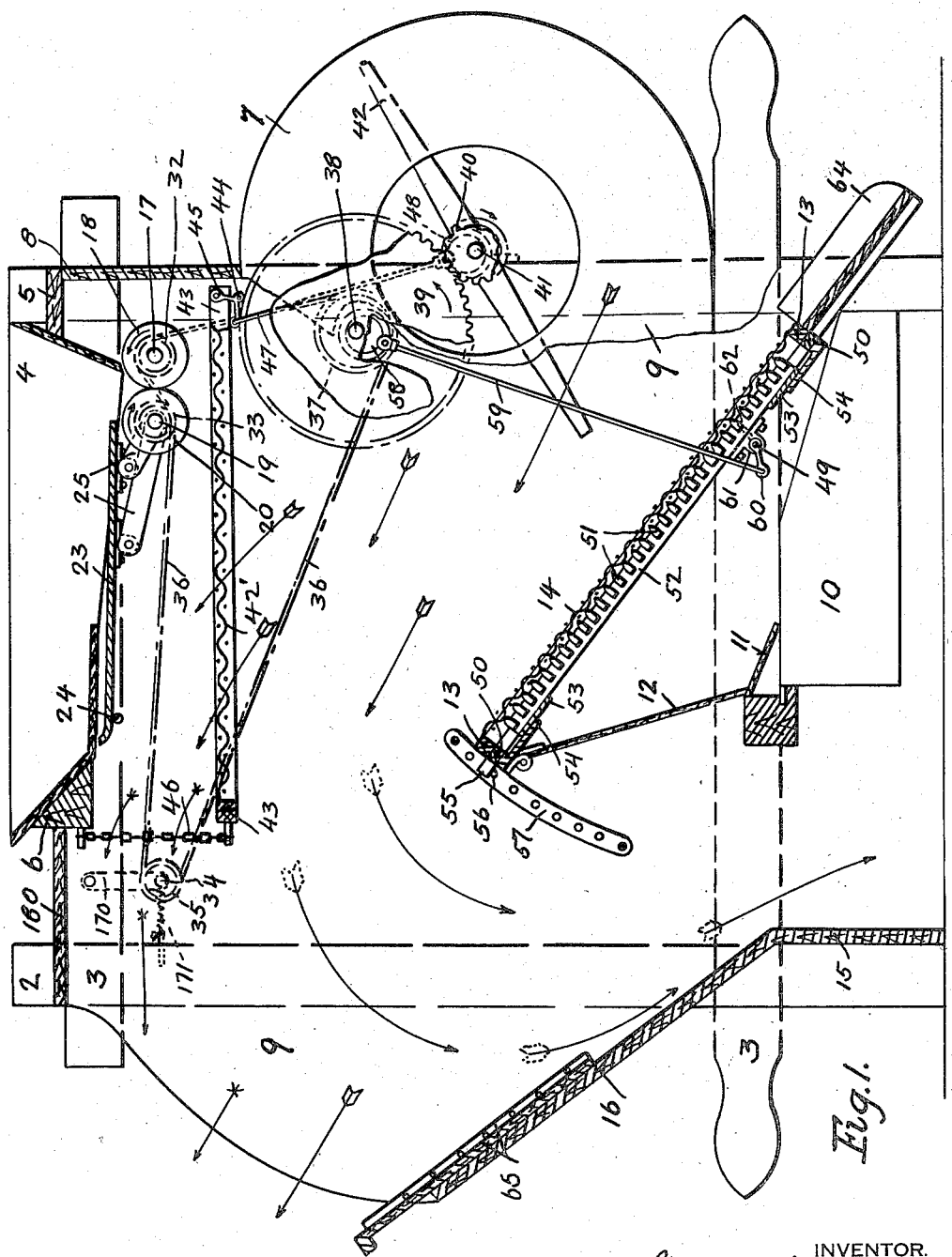
Fig. 1 is, in part, a vertical longitudinal section through the frame of the apparatus and supports for the upper and lower screens, and end elevations of the feed rollers and the driving gear.

In the following specification will be described the prefered form of construction, but it must be understood that changes may be made therein without departing from the spirit of the invention and the scope of the claims herein made.

In this apparatus wire screens of suitable mesh are used in preference to sheet-metal screens now used quite commonly in apparatus of this class, for the following reason: To secure the efficient functioning of apparatus doing this work it is essential that the stream of air built up therein and passing therethrough and through the screens shall be substantially constant throughout its course; that no part of the apparatus, such as the screens, through which the current of air passes, shall have the effect of increasing this pressure. With the use of sheet-metal screens it has been found from very careful observation that the air pressure thereagainst is greatly increased because the air cannot freely widely pass therethrough with the result that the pressure builds up against said screens with the result that the velocity of the air passing in separated streams through the holes in these screens has a very high pressure with the result that such light grain as oats is blown away. To permit this relatively light grain to pass through these sheet-metal screens the operator must be on the alert and reduce the strength of the air current to permit the oats to pass through, and with it weeds and especially wild oats which will not be thrown out due to weakness of the air current. To overcome this faulty cleaning the air current has to be strengthened thus blowing grain over the end of the grain screen. This grain mixed with weeds is returned to the threshing cylinder, thus overloading the screen and blowing the grain into the straw pile or to the field. This faulty cleaning is particularly noticeable in modern combines.

In grain cleaners now on the market there is in use a sheet-metal screen. A plurality of these screens, often from two to six in each apparatus, is used. The current of air is guided through a narrow channel between these screens and in its passage therebetween it has no material effect in cleaning. It is only at the end of the apparatus where the grain is falling down that the current of air comes really into contact with the mixed grain and waste matter. This location is very restricted in size, and in combination with the very short time the air current can act upon a given body of grain etc. the result is that the cleaning method is not at all efficient. In contrast to this old method, the method herein disclosed shows that the air current is the chief element in the efficient cleaning of the good grain, and the saving in the loss thereof along with the waste matter. Herein the air current passes completely through the adjustable uncleaned-grain screen uniformly throughout its length thus removing much light waste matter before it touches the screen, over the rear end thereof, and much of this light waste matter will pass from the apparatus without further contact therewith. Somewhat heavier matter will pass through the said screen and will then be caught in the full blast of the air current and thrown against the back of the apparatus, the undeveloped grain and weed seeds being thus separated from the chaff and straw which will be carried on out of the apparatus. The heavy grain and seeds and sand will fall down onto the adjustable sand screen where final separation of the grain and waste matter takes place. At this step of the method the air current has no material effect.

The frame of the apparatus may be of any suitable construction. As shown it may consist of vertical posts 2, tied together by the horizontal bars 3. The hopper 4, is supported by the bars 5, and 6, supported on the bars 3. The rear side of the apparatus is largely closed by the casing 7, and wall 8 on which rests the bar 5. The board or plate 180, supported by the bars 3, and in contact with the bar 6, completes the closing of the top of the apparatus. The side walls 9, close the sides of the apparatus, and the bottom thereof is partly closed by the sand box 10, chute 11, and the sand board 12, which is hinged at its upper end to the frame 50, supporting the sand screen 14, and its frame 13. The wall 15, and the separation board 16, partly close the front of the apparatus. Fixed on the shaft 17, suitably journalled below the bars 3, is a roller 18. Fixed on the shaft 19, is a roller 20 (Figs. 1 and 2). The shaft 19, is journalled in a support 21 (Fig. 2), slidably housed within the housing 22, suitably supported by and below the bars 3.

The upper end of the plate 23, is slidably supported on the rod 24, which extends across the apparatus. The lower end of the plate 23, is supported by any suitable means; such as the arms 25, hinged thereto, and supported at their lower ends on the shaft 19.

The plate 23, is slightly slopingly supported immediately below the discharge opening of the hopper 4. Any longitudinal movement of this plate is initiated solely by the movement of the roller 33, away from the roller 32.

Slidably mounted partly in the housing 22, is a rod 26 (Fig. 2), the inner end of which is held on the support 21, by any suitable means, such as a bracket 210. Through the inner end of the rod 26, passes a pin 211, carried by the bracket 210. This construction permits said rod to pivot on said bracket. Mounted on the rod 26, is a coiled spring 27, and mounted on the outer portion of said rod to amply embrace part of the spring 27, is a coiled spring 28. One end of the spring 28, is suitably attached to the outer end of the housing 22, and the other end of this spring as well as the outer end of the spring 27 are attached to the plate 29, sliding on the rod 26.

Pivoted on the rod 24, is a lever 30, connected by a chain 31, to the rod 26.

By means of the elements described the distance between the rollers 18, and 20, can be altered automatically, or manually, to secure a fixed distance therebetween. If hard material such as a stone, or relatively hard material such as a lump of dry clay, should be fed between said rollers, the roller 20, and its support 21, will move away from the roller 18, pass the stone and prevent breakage, or gradually break up the lump of clay. During this operation the rod 26, and the spring 27, will be moved outwardly. Since the spring 27, is attached to the plate 29, and also the spring 28, this latter will be extended. So soon as the obstruction has been cleared the springs 28, and 27, will return the rollers to original position.

Obviously manual movement of the lever 30, will result in the movement of the roller 20, the desired distance from its fellow, and by means of its sector 300, the lever 30, can be held in any desired position.

Mounted on the shaft 17, is a pulley 32, and mounted on shaft 19, is pulley 33. Mounted on the trunnion 34, held in the plate 170, supported by a bar 3, is a pulley 35. Over these pulleys passes a belt 36, which also passes over the drive pulley 37, mounted on the stub-shaft 38. Keyed to the stub-shaft 38, is a toothed wheel 39, which is in mesh with the pinion 40, keyed to the shaft 41. Keyed to this shaft 41, are blades 42, which, together with the casing 7, constitute the blower or fan. If this blower is power driven the shaft 41, receives the power from the drive pulley 411, whereas if the blower is manually driven, the stub-shaft 38, will receive the power. The plate 170, is connected by a spring 171, with a post 2, thus the belt 36 is kept taut.

Suspended below the rollers 18, and 20, and their immediately-associated elements, is the grain screen 42' (Fig. 1), made of wire of the desired mesh. This screen is carried by the frame 43, the rear end of which is supported by the rod 44, carried by the front posts 2, through the medium of the bell-crank levers 45, pivoted one at each side thereof. The front end of the frame 43, is vertically adjustably supported by the chain 46, coupled to the bar 6. Thus the horizontal position of the screen 42', can be adjusted as required, to time control the distribution thereover of the uncleaned grain.

The bell-crank levers 45, are coupled by the rods 47, to the eccentrics 48, keyed to the shaft 41.

Pivotally supported on the rod 49, is the frame 50. Positioned to reciprocate longitudinally within the frame 13 carrying the screen 14, and the frame 50, and immediately below this screen is a cleaning device, the function of which is to dislodge all material, such as broken grain, that would clog up this screen. The keeping free of any clogging up is an important feature of this invention. The cleaning device herein shown comprises a plurality of spaced scraping bars 51, which are suitably carried by longitudinal supports 52. These scraping bars are preferably bedded in the supports 52, and project thereabove equal distances so that in operation they lightly scrape or brush against the under side of the screen 14. To increase the efficiency of these bars 51, their working tops are crowned as shown clearly in Fig. 6. These bars 51, together with the supports 52, are used to form a frame, and this frame has longitudinal movement within the frames 13, and 50. To provide for this movement any suitable means may be employed. The preferred means consists of metal plates 53, placed at each corner of the frame composed of 51, and 52, and secured to 52. These plates 53, rest upon plates 54, carried by the frame 50, and together with the bars 51, and supports 52, have movement longitudinally on the plates 54.

The upper end of the frame 50 and its associated elements are adjustably supported by any suitable means at the desired inclination. As shown an extension 55, of the frame 50, rests upon a bar 56, adjustably held in the sector 57, suitably supported. The adjustable character of the screen 14, permits time control of the distribution thereover of the material thereon.

Keyed to the stub-shaft 38, is the eccentric 58 (Fig. 1), which is coupled to the lever 60, keyed on the rod 49, by the rod 59, held in bearings 61, secured to the frame 50, at each side thereof. Carried by the rod 49, are levers 62 (Fig. 7), which are adapted to be rocked by said rod 49, and so move back and forth longitudinally below the screen 14, the bars 51, to keep the screen free of any clogging matter. Any suitable means may be employed to convey movement from the levers 62, to the said brushing device. The means shown comprises pins 63, carried by the supports 52, and between these the levers 62, are rocked.

The sand, etc., passing through the screen 14, falls directly into the box 10, or onto the sand board 12, and thence down it into the box. The salvaged or separated grain or seed passes into and from the spout 64.

The separation board 16, may be extended longitudinally by means of the board 65, slidably supported thereon and adapted to be held in any desired position.

The arrows in full lines show approximately the path of the air current through the grain screen 42', and through the apparatus, while the arrows with dotted tails show the path of the material, too heavy to be blown away as it strikes the separation board 16. This matter slides down this board onto the floor through the passageway between the sand box 10, and the wall 15.

The arrows with crossed tails show the direction of movement of the chaff, straw, and dust, blown away by the air current passing through the screen 42'.

The means to support the sand screen cleaner is of very simple and inexpensive construction. Any wear between the plates 53, and 54, may be compensated for by the use of shims so as to maintain the correct position of the bars 51, with respect to the screen 14. The taking up of this wear is important.

Because of the closed chamber below the sand screen 14, formed by the side walls 9, said board 12, chute 11, and sand box 10, the current of air passing through the apparatus does not pass through the screen 14, enough to be diverted from its efficient path through the apparatus to its front opening.

Broadly classified there are three grades of materials to be separated from the body of uncleaned grain by this apparatus and method—(a), heavy, (b), intermediate, and (c), light, materials. The heavy materials are whole grain and heavy seeds of weeds, and sand. The intermediate materials are those recovered by impact against the separation board 16, and the light materials, such as chaff and straw carried readily away by the air current.

The size of the mesh in the screen 42', is smaller than that of screen 14. These screens are interchangeable in use.

The use of the term "brushing" is herein meant to mean the automatic operation of suitable means, such as the bars 51, in constantly displacing blocking matter or materials from the screen 14.

The lever 30 and its immediately-associated elements are located on the outside of the wall 9, at the left-hand side of the apparatus. On the opposite side of the apparatus on the outer side of the wall 9 (Fig. 3), is located the means to automatically control the relative positions of the rollers 18 and 20, at this side.

To manually adjust the position between these rollers at the right-hand side of the apparatus simultaneously the rollers at the left-hand side are adjusted, the rod 24, is carried through to the right-hand side of the apparatus and is provided with an arm 240, connected by a chain 241, with its associated rod 26.

Grains or seeds of different weights and shape must be controlled as to the time they are passing over the screen, and the distribution thereof over the screen. By making the screens herein used adjustable, much better cleaning of the seed and grain is possible, and wastage is reduced to a minimum.

Where the working undergoing cleaning drops onto a horizontal screen obviously there is poor distribution thereof thereover, and hence the cleaning effect of the wind stream is not efficient. Unclean grain such as wheat and peas, falling on the inclined screen 42', will be well distributed thereover, largely because of their weight and shape. But this inclination of said screen will have to be increased enough to secure good distribution of oats, and barley thereover, because of their lighter weight and shape.

In use, the inclination or slope of the screen 14, is controlled by the operator through the medium of the sector 57, and the extension 55, according to the character of the uncleaned seed or grain to be screened thereby.

To firmly support the frame 50, the sand screen 14, and bars 51, the rod 49, is suitably held in bearings supported by the bottom horizontal bars 3.

There is a sector 57, at each side of the apparatus secured to the inner side of each side wall 9. The holes in these sectors are in alignment with holes formed in the said side walls, and held therein are the bars 56, accessible at the outer side of said walls. By changing the position of these bars the inclination of the screen 14, may be controlled. The screen 14, and immediately-associated parts are accessible through the front opening of the apparatus.

The wind stream is also closed in at the top of the apparatus by the hopper 5, boards 5, and 6, and the board or plate 180.

I claim:

1. In a grain-cleaning apparatus the combination with a hopper, of a fixed roller journalled at each side of the apparatus below the outlet from said hopper, a housing mounted at each side of the apparatus, a member mounted in each of said housings, a second roller journalled in said members, a rod hinged to one end of each of said members and each passing through the open front end of its associated housing, a plate fixed on each rod near the outer end thereof, a coiled spring on each of said rods with its outer end attached to its associated plate and its inner end contacting its associated member, another coiled spring on each of said rods embracing the spring thereon from beyond the outer end of the associated housing, the outer end of each embracing spring being attached to its associated plate, and the inner ends thereof being attached to the outer end of the associated housing, means to manually move said rods and their connected parts to adjust the positions of said second rollers with respect to their associated rollers.

2. In a grain-cleaning apparatus the combination of a suitably-supported hopper; a pair of horizontal parallel shafts journalled below the outlet from said hopper; a driven roller on each of said shafts and normally in contact; means to permit the separation of one of said rollers and its shaft horizontally from the other roller and its shaft; a substantially horizontal movable plate sliding with one end on a fixed rod below the hopper; the other end of said plate supported by arms secured to each side of said plate end and mounted on said horizontally movable shaft, said arms horizontally moving said plate to facilitate the flow of unclean grain when the horizontally-movable roller and its shaft are moved away from the other roller.

3. An apparatus of the class described comprising a housing closed by two side walls; means supported by said housing to close the top thereof; an adjustable upper wire screen supported within said housing; an inclined second wire screen pivoted at its lower end to said housing well below said upper screen; a closed chamber below said lower screen embracing the side walls; a sand box at the bottom of said chamber; a sand board hinged at its upper end to the upper end of said lower screen and resting on said sand box and means whereby the inclination of said lower screen and sand board may be simultaneously manually altered to maintain an air current of uniform and constant strength through said housing.

GUSTAV UNTERBERG.

REFERENCES CITED

The following references are of record in the file of this patent:

UNITED STATES PATENTS

| Number | Name | Date |
|---|---|---|
| 11,543 | Beach | Aug. 15, 1854 |
| 127,788 | Nesbitt | June 11, 1872 |
| 183,059 | Leach | Oct. 19, 1876 |
| 282,720 | Gunckel | Aug. 7, 1883 |
| 314,123 | Hasselbusch | Mar. 17, 1885 |
| 380,097 | Davis | Mar. 27, 1888 |
| 642,006 | Rousse | Jan. 23, 1900 |
| 692,430 | Critchfield | Feb. 4, 1902 |
| 1,365,304 | Cleland | Jan. 11, 1921 |
| 1,560,313 | Pittman | Nov. 3, 1925 |
| 1,663,027 | Sorensen | Mar. 20, 1928 |
| 1,667,611 | Thompson | Apr. 24, 1928 |
| 1,777,661 | Dellenbarger | Oct. 7, 1930 |
| 2,120,613 | Johnson | June 14, 1938 |

FOREIGN PATENTS

| Number | Country | Date |
|---|---|---|
| 492,785 | Germany | Feb. 27, 1930 |